United States Patent [19]

Esau

[11] Patent Number: 4,549,482

[45] Date of Patent: Oct. 29, 1985

[54] CYLINDER MOUNTING APPARATUS FOR HYDRAULIC SQUEEZE CONTROL IN A CROP BALER

[75] Inventor: Edward W. Esau, Hesston, Kans.

[73] Assignee: Hesston Corporation, Hesston, Kans.

[21] Appl. No.: 635,648

[22] Filed: Jul. 30, 1984

[51] Int. Cl.[4] .............................................. B30B 9/30
[52] U.S. Cl. ..................................... 100/191; 100/179
[58] Field of Search ................ 100/191, 192, 179, 43, 100/188, 189, 147, 148

[56] References Cited

U.S. PATENT DOCUMENTS

| | | | |
|---|---|---|---|
| 3,350,999 | 11/1967 | Morse | 100/191 |
| 3,518,937 | 7/1970 | Westerman | 100/192 |
| 3,659,427 | 5/1972 | Harza | 100/191 X |
| 3,866,529 | 2/1975 | Holman | 100/43 |
| 4,489,648 | 12/1984 | Naaktgeboren | 100/191 |

Primary Examiner—Timothy F. Simone
Attorney, Agent, or Firm—Schmidt, Johnson, Hovey & Williams

[57] ABSTRACT

The squeeze cylinder is inverted with the cylinder casing attached to a transverse, overhead truss above the bale case and the piston rod projecting downwardly from the casing for attachment to the upper squeeze plate of the apparatus. Oil is supplied to the cylinder on the upper side of the piston, while the lower, vented side of the piston is open to the atmosphere via a vent/drain passage. The lower end of the cylinder is provided with a lowermost, annular shoulder bearing against the lower side of the supporting truss and with a snap ring on the opposite, upper side of the truss so that the shoulder and the snap ring cooperate to securely and readily secure the cylinder assembly in operating position.

7 Claims, 4 Drawing Figures

U.S. Patent   Oct. 29, 1985   4,549,482
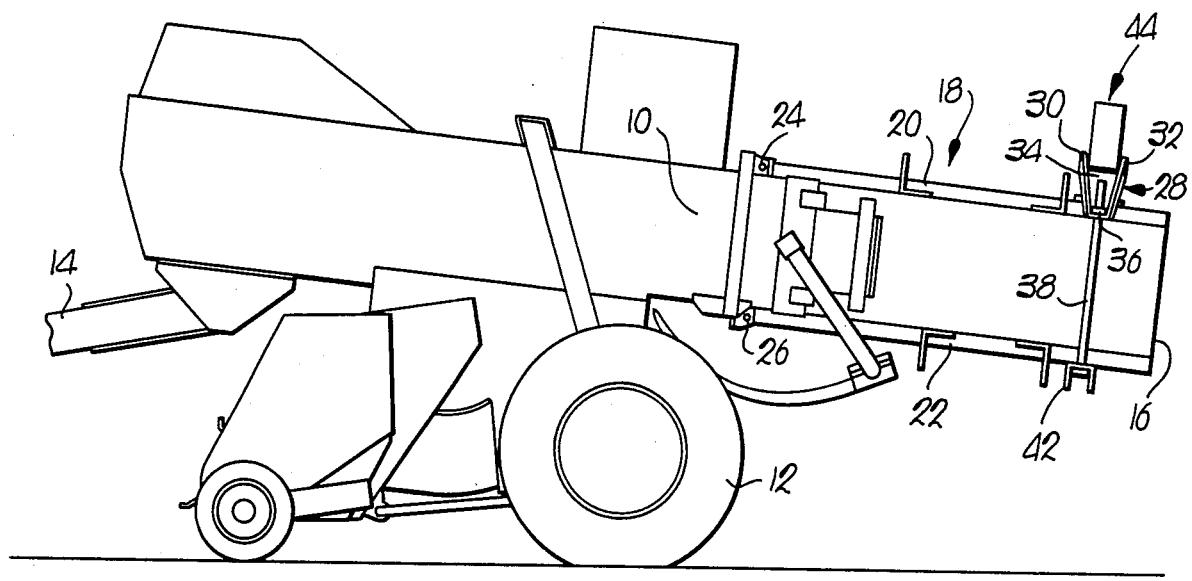
Fig.1.
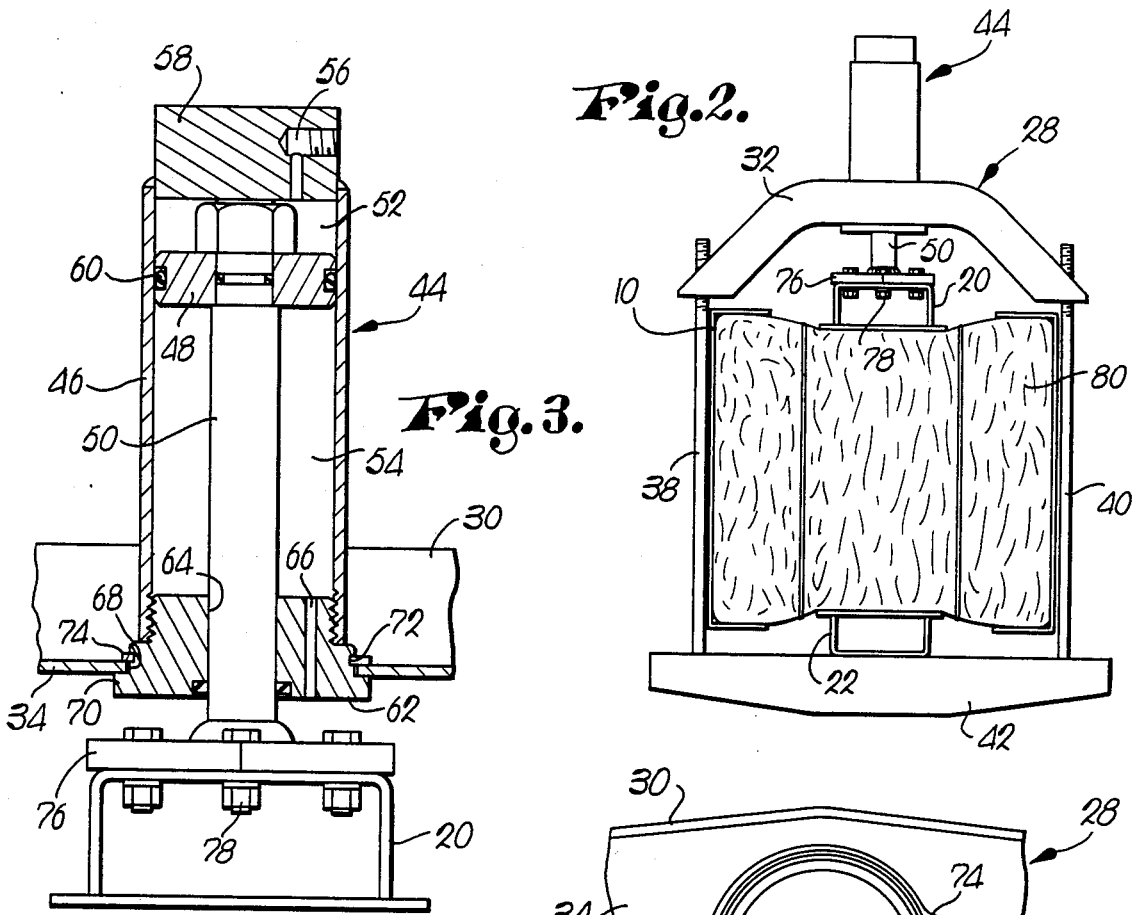
Fig.2.
Fig.3.
Fig.4.

CYLINDER MOUNTING APPARATUS FOR HYDRAULIC SQUEEZE CONTROL IN A CROP BALER

FIELD OF THE INVENTION

The invention relates to a bale squeezing apparatus for a crop baler, and, more specifically, to a means for readily fastening a bale squeezing ram to a truss of such apparatus.

BACKGROUND

In existing crop balers, various mechanisms have been disclosed for imparting a resistive squeezing force to the bale emerging from the crop baler so that the compacting plunger of the baler upstream from the squeeze apparatus is provided with an effective backstop against which fresh charges of crop materials can be compacted.

For example in a prior art bale squeezing apparatus as disclosed in Hesston 4600 Beeline Baler Parts Catalog, 1st Edition (Issue 1), 2/81, page 32, upper and lower squeeze plates are pivotally connected to the bale case with the pivotal axes of the respective squeeze plates spaced and mutually parallel. The distal end of the upper squeeze plate is bolted to the base of a hydraulic cylinder assembly, and the piston rod of the cylinder extends upwardly from the base to a transverse truss weldment fabricated from several, separate pices. There it is connected by means of a transverse pin to the truss. The lower squeeze plate is welded at the distal end thereof to a transverse member, and a pair of tie rods extend upwardly through the member and the truss on opposite sides of the bale case to maintain a constant distance between the truss and the member. When the piston rod is extended, movement of the rod reacts between the truss and the distal end of the upper squeeze plate to thereby swing the squeeze plates toward or away from each other according to the direction of travel of the piston rod.

This particular prior art construction presents two problems. First, the relatively complicated design of the truss itself leads to higher than desired manufacturing costs, and, secondly, having the cylinder upright so the piston rod extends from the top of the cylinder sometimes encourages deleterious matter such as water to seep by gravity into the bore of the cylinder around the rod.

SUMMARY OF THE INVENTION

Therefore, it is a primary object of this invention to provide a bale squeezing apparatus of simplified design which also permits the cylinder thereof to remain in an inverted position when installed such that any moisture tending to form in the non-oil-receiving end of the cylinder may be continuously drained therefrom by simple gravity without detaching the cylinder from the baler.

In carrying out this object, the present invention contemplates a simple mounting truss which is generally U-shaped in cross-sectional configuration and which extends across the top of the bale case for supporting the squeeze cylinder assembly of the apparatus. The cylinder assembly is inverted such that the piston rod projects from the lower end of the cylinder casing and is fixed to the upper squeeze plate of the baler. That end of the cylinder assembly through which the rod reciprocates is provided with a plug telescopically receiving the rod and having the means by which the assembly is attached to the bight of the truss member. In this respect, the cylinder assembly is inserted into an aperture in the bight from the bottom of the latter to the extent permitted by a shoulder on the plug, and an annular groove around the plug at a point on the latter just inboard of the bight receives a resilient snap ring serving to prohibit withdrawal of the assembly from the truss once installed. The plug is provided with a drain passage therethrough communicating the interior of the cylinder casing with the atmosphere.

BRIEF DESCRIPTION OF THE DRAWINGS

FIG. 1 is a fragmentary, side elevational view of a crop baler provided with bale squeezing apparatus constructed in accordance with the principles of the present invention;

FIG. 2 is a rear-end elevational view of the baler on an enlarged basis;

FIG. 3 is a fragmentary, vertical cross-sectional view through the top portion of the squeeze apparatus looking forwardly in the same direction as FIG. 2; and FIG. 4 is a fragmentary top plan view of the squeeze apparatus.

DETAILED DESCRIPTION

The baler as illustrated in FIG. 1 has a generally horizontally extending bale case 10 supported for ground travel by wheels 12 (only one being shown), there being a forwardly disposed tongue 14 which may be hitched to a towing tractor. A pickup 16 located under the bale case 10 at the forward extremity of the latter is adapted to lift crop windrows from the field as the baler is towed thereacross and to feed the same upwardly and rearwardly to other mechanism (not shown) which loads the crop materials up into the bale case 10 where it is compacted rearwardly by a reciprocating plunger (not shown). The plunger pushes the charge of crop materials rearwardly through the bale case 10 toward the open rear end 16 thereof, and in order to provide resistance to the rearward movement of such crop materials so as to provide a backstop for the plunger, the bale case 10 is provided with apparatus broadly denoted by the numeral 18 for applying a squeezing force against the emerging bales of material. Thus, in a broad sense the baler may be thought of as an extrusion-type baler wherein the open rear end 16 defines an orifice which has its dimensions laterally adjustable for the purpose of resisting the efforts of the compacting plunger in pushing and compacting the materials out of the open end 16.

The squeeze apparatus 18 includes an upper and a lower squeeze plate 20 and 22 respectively hinged about forwardly disposed, transverse pins 24 and 26 respectively. A generally transversely U-shaped upper supporting truss 28 spans the top of the bale case 10 and has a pair of upwardly projecting legs 30 and 32 interconnected along their bottom extremities by a bight 34. As shown best in FIG. 2, when viewed from the rear of the baler the truss 28 appears downturned at its opposite two ends. At those locations, suitable connector means 36 (FIG. 1) are provided for securing opposite ends of the truss 28 to a pair of vertically extending rods 38 and 40 on opposite sides of the bale case 10. At their lower ends the rods 38, 40 are fixed to a transverse member 42 spanning the bale case 10 below the latter and rigidly affixed to the otherwise free end of the lower squeeze plate 22. In this way, the truss 28, tie rods 38, 40, lower transverse member 42 and lower squeeze plate 22 are connected together in force-transmitting relationship to one another and for movement in unison relative to the bale case 10 during application of a squeezing force as will hereinafter be explained.

The squeeze apparatus 18 further includes a single-acting hydraulic piston and cylinder assembly 44 having a cylindrical casing 46, an internal piston 48, and an internal piston rod 50 telescopically received within the casing 46. A pair of chambers 52 and 54 are defined on opposite sides of the piston 48, the chamber 52 communicating with a source of hydraulic oil (not shown) via an orifice 56 in the closed upper end 58 of the cylinder 46. An O-ring seal 60 about the piston 48 maintains the chambers 52 and 54 separated from one another throughout all positions of the rod 50 when ol is added to and removed from the chamber 52.

The opposite, lower end of the assembly 44 is provided with a plug 62 having a bore 64 therethrough telescopicaly receiving the rod 50 and a vent passage 66 extending parallel to the bore 64 and functioning also as a drain for accumulating moisture within the chamber 54. The plug 62 may be secured to the lower end of the casing 46 in a number of suitable ways, such as, for example, via intermeshing threads as illustrated.

The bight 34 of the truss 28 is provided with an aperture 68 of such size as to permit the casing 46 to be inserted through the latter from below the same during installation. Likewise, most of the plug 62 is of suitably small diameter as to pass through the aperture 68. However, a lowermost, annular shoulder 70 on the plug 62 is of larger diameter than the aperture 68 and thus limits the extent of insertion of the assembly 44 up through the aperture 68. With the plug 62 thus projecting part way through the aperture 68, an annular groove 72 in the plug 62 immediately above the bight 34 provides a seat for and receives a circumferentially resilient, discontinuous keeper or snap ring 74 having an external diameter exceeding that of the aperture 68. Consequently, keeper 74 overlaps the region of bight 34 immediately adjacent the aperture 68 and works in opposition to the shoulder 70 to preclude withdrawing movement of the assembly 44 from the aperture 68.

The lowermost end of the rod 50 is secured to a bracket 76 which in turn is attached via bolts 78 or the like to the upper squeeze plate 20.

OPERATION

As illustrated in FIG. 2, a bale 80 emerging from the discharge end 16 of the bale case 10 is subjected to a squeezing action by the upper and lower squeeze plates 20, 22. In this connection, as oil is supplied to the chamber 52 of the cylinder assembly 44, the rod 50 extends, and the resistance to such extension brought about the bale 80 causes the casing 46 to rise. This motion of the casing 46 is likewise experienced by the truss 28 which transmits the rising movement to the lower squeeze plate 22 via the rods 38, 40 and the cross member 42 such that the bale 80 experiences an equal amount of squeezing force on its opposite upper and lower sides by the plates 20 and 22. The extent to which the squeezing force is applied, and thus the dimension of the outlet opening 16, is controlled by the volume of oil which is injected into the chamber 52 of cylinder casing 46.

It will be appreciated that the truss 28 is of relatively simple, uncluttered design well capable of carrying out its intended force-transmitting function, as well as providing a suitable mounting for the cylinder assembly 44.

In this latter respect, it will also be appreciated that the truss 28, cooperating with the mounting features of the cylinder assembly 44 associated with the plug 62, enables the cylinder assembly 44 to be oriented in an inverted manner with the passage 66 forming an effective moisture drain for the empty chamber 54.

Moreover, the unique way in which the inverted cylinder assembly 44 is attached to the truss 28 via the keeper ring 72 and shoulder 70 associated with the plug 62 provides a simplified attachment means promoting quick and easy installation as well as lower maufacturing costs.

What is claimed is:

1. In a bale squeezing apparatus for the discharge end of an extrusion-type crop baler, the improvement comprising:

at least one transversely movable squeeze plate for enlarging or reducing the dimensions of the discharge opening of the bale case;

a fluid pressure piston and cylinder assembly for effecting said transverse movement of the plate, said piston of the assembly having a rod provided with an outer end secured to said plate;

a support for the assembly; and means for attaching the cylinder of said assembly to the support, said attaching means including:

an aperture in said support adapted to receive the cylinder, a shoulder on said cylinder disposed to limit the extent of insertion of the latter into said aperture, and a keeper attachable to the cylinder on the opposite side of the support from said shoulder for preventing withdrawal of the cylinder from said aperture.

2. In a bale squeezing apparatus as claimed in claim 1, wherein said assembly is single-acting, having an internal chamber on one side of the piston which is vented to the atmosphere via a passage in one end of the assembly, said assembly being inverted such that said one end of the assembly and said passage are disposed below the opposite end of the assembly whereby to permit said passage to function as a moisture drain.

3. In a bale squeezing apparatus as claimed in claim 1, wherein said assembly includes a casing having a plug in one end thereof provided with a hole for the rod, said shoulder being on said plug.

4. In a bale squeezing apparatus as claimed in claim 3, wherein said plug projects in opposite directions through said aperture and is provided with an annular groove therein disposed on said opposite side of the member, said keeper comprising a resilient, discontinuous, circumferentially expandable ring snapped into said groove and overlapping portions of said opposite side of the support adjacent said aperture.

5. In a bale squeezing apparatus as claimed in claim 4, wherein said assembly is single-acting, having an internal chamber on one side of the piston which is vented to the atmosphere via a passage in said plug, said assembly being inverted such that said plug and said passage are disposed below the opposite end of the assembly whereby to permit said passage to function as a moisture drain.

6. In a bale squeezing apparatus as claims in claim 1, wherein said support comprises a generally transversely U-shaped member having a pair of spaced legs and a bight interconnecting said legs, said aperture being located in said bight.

7. In a bale squeezing apparatus as claims in claim 6, wherein said apparatus further includes a second transversely movable squeeze plate disposed in spaced opposition to said one plate, and structure transmitting force from said support to said second plate for causing both said plates to move toward one another when a bale is squeezed therebetween and said rod is extended.

* * * * *